United States Patent [19]
Weber

[11] 4,434,143
[45] Feb. 28, 1984

[54] CARBONATE ION CONTROL TO PREVENT LOSSES OF VANADIUM IN OXIDATION OF HYDROGEN SULFIDE

[75] Inventor: Guenter Weber, Linden, Fed. Rep. of Germany

[73] Assignee: Linde Aktiengesellschaft, Wiesbaden, Fed. Rep. of Germany

[21] Appl. No.: 406,802

[22] Filed: Aug. 10, 1982

[30] Foreign Application Priority Data

May 26, 1982 [DE] Fed. Rep. of Germany ....... 3219825

[51] Int. Cl.$^3$ .................. B01D 53/34; C01B 17/05
[52] U.S. Cl. .................................. 423/226; 423/224; 423/573 R
[58] Field of Search ................ 423/224, 226, 573 G, 423/573 R

[56] References Cited

U.S. PATENT DOCUMENTS 4,325,936  4/1982  Gowdy et al. .................. 423/573 R

OTHER PUBLICATIONS

Brennstoff Chemie, vol. 50, 1969, No. 4, pp. T24 & T25.

*Primary Examiner*—Earl C. Thomas
*Attorney, Agent, or Firm*—Millen & White

[57] ABSTRACT

In the simultaneous scrubbing and oxidation of $H_2S$ with a vanadate-containing aqueous alkaline scrubbing agent, so as to prevent precipitation of vanadium values, the concentration of $CO_3^{--}$ ions in the scrubbing agent is adjusted, preferably to a minimum content of $CO_3^{--}$ ions of 12.5 g/l of scrubbing agent. The scrubbing agent is regenerated conventionally by treatment with an oxygen-containing gas in an oxidizer.

5 Claims, No Drawings

CARBONATE ION CONTROL TO PREVENT LOSSES OF VANADIUM IN OXIDATION OF HYDROGEN SULFIDE

CROSS-REFERENCE TO RELATED APPLICATION

This application relates to concurrently filed application entitled "SIMULTANEOUS SCRUBBING AND OXIDATION OF HYDROGEN SULFIDE USING EXCESS VANADATE", by Guenter Weber, the contents of which are incorporated by reference herein.

BACKGROUND OF THE INVENTION

This invention relates to prevention of losses of vanadium in the hydrogen sulfide scrubbing and oxidation process wherein a gaseous mixture is scrubbed with an aqueous alkaline scrubbing agent containing five-valent vanadium as the oxidizing agent. The hydrogen sulfide is oxidized to elementary sulfur while the five-valent vanadium is reduced to four-valent vanadium. The reduced scrubbing agent is subsequently regenerated for reuse by treatment with an oxygen-containing gas for the reoxidation of the four-valent vanadium.

Processes for the simultaneous absorption and oxidation of hydrogen sulfide are known (for example, Brennstoffchemie [Fuel Chemistry], Volume 50, 1969, No. 4, pages T24 and T25), in which the hydrogen sulfide is initially bound as hydrogen sulfide by the alkali, and then reacts with the oxidizing agent, a salt of anthraquinonedisulfonic acid and/or five-valent vanadium, with liberation of sulfur and reduction of the oxidizing agent. In order to reactivate the solution, air is blown through an oxidizer and, by this means, the reduced oxidizing agent is oxidized. At the same time, the sulfur floats to the surface of the solution and collects there as a supernatant scum which is drawn off, so that the sulfur, in turn, can be removed therefrom, for example, by filtration.

It has been demonstrated that, in the regeneration of the reduced scrubbing solution, either effective or real losses of vanadium can occur. Inasmuch as the solubility of four-valent vanadium is less than that of five-valent vanadium, on occasion the former may precipitate out and then be no longer available for the subsequent hydrogen sulfide scrubbing. Even with no precipitation, the reoxidation of the reduced vanadium often cannot be completely carried out because the expense is industrially unacceptable, and in this case only a part of the vanadium dissolved in the scrubbing agent is available in the five-valent form for the subsequent loading of the scrubbing agent with hydrogen sulfide, thereby creating an effective vanadium loss. Furthermore, these losses of vanadium must be compensated for by using concentrations of vanadium which are higher than those stoichiometrically necessary for the conventional concentrations of $CO_3^{--}$ ions of about 8 g/l of scrubbing agent.* There is, in turn, the danger that vanadium can thereby precipitate. This tendency of vanadium to precipitate has also been observed when the scrubbing agent has remained too long in the reduced state.

*(Here and in the following $CO_3^{--}$ concentration is the total alkalinity in the scrubbing solution expressed as carbonate.)

SUMMARY OF THE INVENTION

An object of the present invention is to provide a process of the type mentioned above wherein precipitation of vanadium in the scrubbing agent can be prevented in a simple and cost-effective manner.

Upon further study of the specification and appended claims, further objects and advantages of this invention will become apparent to those skilled in the art.

These objects are achieved according to the invention by adjusting the $CO_3^{--}$ content in scrubbing agent to prevent precipitation of vanadium values, preferably by maintaining a minimum content of $CO_3^{--}$ ions in the scrubbing agent of at least 12.5 g/l of scrubbing agent.

The invention is based on the surprising discovery that precipitation of reduced vanadium in a scrubbing agent can be eliminated by increasing the concentration of $CO_3^{--}$ ions in the scrubbing agent. This can be accomplished, for example, by the addition of a carbonate. The particular carbonate is irrelevant, as long as it supplies $CO_3^{--}$ ions, but alkali metal carbonates, in particular sodium or potassium carbonate, or ammonium carbonate are particularly suitable for reasons of cost.

It has been found to be advantageous in this process to maintain the content of $CO_3^{--}$ ions at a value between 13 and 17 g/l.

Specifically, the content of $CO_3^{--}$ ions necessary to prevent vanadium from precipitating is proportional to the amount of reduced vanadium present in the scrubbing agent and which is to be kept in solution. Simple routine experiments can be conducted to determine the minimum amount and preferred range.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The simultaneous scrubbing and oxidation of hydrogen sulfide was carried out with a scrubbing agent which, in the reduced state, contained in all experiments using 3 g anthraquinonedisulfonic acid per liter of scrubbing agent, 1.5 g of vanadium per liter of scrubbing agent and 20 g, 30 g or 40 g of $Na_2CO_3$ (make-up) per liter of scrubbing agent. The scrubbing agent was kept in the reduced state for more than 400 hours.

In the scrubbing solution containing 20 g of $Na_2CO_3$ (make-up) per liter, the concentration of reduced vanadium in the liquid phase was still 20 to 40% after this period. Black precipitates of vanadium could be detected visually.

In contrast, in the scrubbing solutions containing 30 or 40 g of $Na_2CO_3$ (make-up) per liter of scrubbing agent, the total vanadium was present in the dissolved form. No precipitates could be observed visually.

Each experiment was conducted by
(a) reducing $V^{5+}$ by introducing a definite volume of $H_2S$ into a definite volume of scrubbing liquid at 38° C.,
(b) keeping the reduced scrubbing liquid at 38° C. for 400 h.
(c) The reduced state of the scrubbing liquid was maintained by bubbling $N_2$ through the reduced scrubbing liquid to prevent a contact of air with the scrubbing liquid.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the removal of H$_2$S from a gaseous mixture comprising:
   (a) scrubbing said gaseous mixture with an aqueous alkaline scrubbing agent consisting essentially of five-valent vanadium and anthraquinone disulfonic acid, the absorbed hydrogen sulfide being oxidized to elemental sulfur while five-valent vanadium is reduced to four-valent vanadium; and
   (b) the reduced scrubbing agent is subsequently regenerated for reuse by exposure to an oxygen-containing gas for the reoxidation of the four-valent vanadium,
   the improvement which comprises adding and maintaining sufficient $CO_3^{--}$ in the scrubbing agent to prevent precipitation of vanadium values.

2. A process according to claim 1, wherein a minimum content of $CO_3^{--}$ ions of 12.5 g/l of scrubbing agent is maintained in the scrubbing agent.

3. A process according to claim 1, wherein the content of $CO_3^{--}$ ions is maintained at a value between 13 and 17 g/l of scrubbing agent.

4. A process according to claim 1, wherein a content of about 30 g of sodium carbonate per liter of scrubbing agent is maintained in the scrubbing agent.

5. A process according to claim 1, wherein a content of about 40 g of sodium carbonate per liter of scrubbing agent is maintained in the scrubbing agent.

* * * * *